Figure 1:
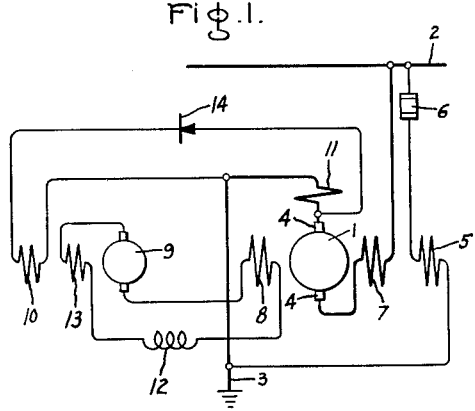

March 21, 1950  A. MANDL  2,501,528

ELECTRICAL SYSTEM

Filed Dec. 14, 1945

Inventor:
Arthur Mandl,
by Prowell S. Mack
His Attorney.

Patented Mar. 21, 1950

2,501,528

UNITED STATES PATENT OFFICE 2,501,528

ELECTRICAL SYSTEM

Arthur Mandl, Sheffield, England, assignor, by mesne assignments, to General Electric Company, a corporation of New York Application December 14, 1945, Serial No. 635,046
In Great Britain January 25, 1944

Section 1, Public Law 690, August 8, 1946
Patent expires January 25, 1964

5 Claims. (Cl. 318—351)

My invention relates to a direct current electrical system provided with a motor which is adapted to be operated at substantially constant speed and to which the excitation is varied for maintaining this constant speed operation.

In the past, constant speed operation of D.-C. electric motors has generally been provided by constructing such motors with shunt field exciting windings, but where the operating conditions are such that sudden fluctuations of the source of voltage which energizes the motor are liable to occur, compound motors have generally been utilized. These compound motors generally are provided with a shunt field exciting winding and a series field exciting winding, such that the series field exciting winding tends to minimize the effect of voltage variation on the operation of the motor. The effect of this series field exciting winding, however, is to modify the speed torque characteristics of the motor so that it does not operate at a substantially constant speed under steady state voltage conditions with variation in load. In certain applications, such as in a motor-alternator set for providing auxiliary services in an electric traction equipment, the motor of the set generally is supplied with direct current from the supply line and the alternator is connected to supply a lighting load or to supply current for the operation of various auxiliary devices which operate more satisfactorily if a constant frequency can be supplied. In such cases, regulation of the output voltage of the alternator also is facilitated by operating the alternator at a constant speed, and this also simplifies the construction and arrangement of the various auxiliary electro-magnetic devices.

An object of my invention is to provide an improved electrical system in which a motor is supplied with an excitation arrangement for maintaining substantially constant speed operation of the motor.

Another object of my invention is to provide an electrical system in which a motor is arranged to operate as a shunt motor under normal steady state supply voltage conditions and to operate substantially as a compound motor having both shunt and series excitation components under transient supply voltage conditions.

Further objects and advantages of my invention will become apparent and my invention will be better understood from the following description referring to the accompanying drawing and the features of novelty which characterize my invention will be pointed out with particularity in the claims annexed to and forming part of this specification.

In the drawing the four figures illustrate schematically electrical systems provided with embodiments of my improved motor excitation arrangements for maintaining substantially constant operating speed under varying supply voltage conditions.

In all the arrangements disclosed in the drawing electrical systems are provided in which a direct current motor is utilized which is adapted to operate at a substantially constant speed irrespective of supply voltage variations, and this is obtained by a special arrangement of field exciting windings and excitation provided to the machine. In each instance the motor is provided with a main component of excitation which is dependent principally upon the supply voltage to the motor and an auxiliary excitation also is provided which is responsive to the armature current of the motor and dependent principally upon variations in the motor armature current to produce a back electromotive force in the motor armature tending to oppose changes of armature current which cause the auxiliary excitation. With such an arrangeemnt an increase in the armature current will produce an auxiliary excitation which will assist the main excitation component in the same manner as a series field exciting winding in a conventional compound machine, but this auxiliary component of excitation is made to be substantially ineffective during normal steady state operating conditions with a substantially constant armature current. This auxiliary excitation may be obtained more readily by providing two auxiliary excitation components which assist and oppose the main excitation of the machine and which operate with and without appreciable time lag irrespectively relative to the variations in motor armature current. Thus, under steady state conditions, the two auxiliary components of excitation substantially nullify each other and the motor operates as a conventional shunt machine while during transient armature current conditions one of the auxiliary components of excitation will produce an effective series component opposing the change in the armature current while the other auxiliary component of excitation which lags the transient will be ineffective sufficiently long to permit the effective operation of the quick response component of excitation to oppose effectively the transient in the motor.

Referring to the drawing, in Fig. 1 I have shown an electrical system in which the main drive motor is provided with an armature 1 adapted to be connected to a source of electrical power supply 2—3 through a suitable current collector and brushes 4. A main component of excitation is provided to the motor by a shunt field exciting winding 5 which is connected across the source of supply 2—3 through a non-linear current-voltage characteristic resistor 6, such that the current flowing through the shunt field exciting winding 5 changes at a higher rate than a straight line variation with changes in line voltage in order to compensate for the non-linearity in the magnetization curve of the motor, such that the excitation provided by the field exciting winding 5 changes substantially in proportion to changes in armature supply voltage, and thereby maintains the speed of the motor substantially constant irrespective of transient fluctuations in supply voltage. The motor also is provided with a series field exciting winding 7 which is adapted to provide an auxiliary component of excitation in the same direction as the excitation provided by the shunt field exciting winding 5. A separately excited field exciting winding 8 is arranged to provide a second auxiliary component of excitation in opposition to the excitation provided by the series field exciting winding 7 and substantially equal to this latter component of excitation, so as substantially to nullify the excitation effects of the field exciting winding 7 under normal steady state conditions. In order to provide this type excitation by the field exciting winding 8 an exciter having an armature 9 is provided which is magnetically excited by a field exciting winding 10 connected across a suitable shunt in the circuit of the armature 1 of the main motor such that the voltage of the exciter 9 is responsive to the current flowing through the motor armature 1. In the arrangement shown in Fig. 1, this shunt comprises a commutating field exciting winding 11 on the motor 1 which is of any conventional form and is provided for improving the commutation of the main motor armature 1. This provides a time lag in the energization of the field exciting winding 8 over the energization of the series field exciting winding 7 to fluctuations in the current of the main motor armature 1 due to the two stages of excitation through which the response must act in the circuit including the field exciting winding 8 over the direct energization of the series field exciting winding 7. In order further to provide a time lag in the response of the energization of the separately excited field exciting winding 8, I may provide a choke coil 12 in series with the field exciting winding 8 and the exciter armature 9 and also provide the exciter with a second field exciting winding 13 connected in series with the exciter armature 9 to provide a compounding effect to this machine. Thus, a surge in the line voltage whereby the current in the series field exciting winding 7 of the main motor increases comparatively rapidly will produce an increase in the resultant or net series auxiliary component of excitation and induce an increase in the back electromotive force in the armature 1, so as to tend to neutralize the effect of the rise in the supply voltage. Furthermore, a decrease in the line voltage will result in a decrease in the auxiliary component of excitation provided by the series field exciting winding 7, such that the series resultant auxiliary component of excitation provided by the field exciting winding 8 will predominate which will oppose the main component of excitation provided by the shunt field exciting winding 5, resulting in a net decrease in the total excitation of the main motor. This will tend to cause a decrease in the back electromotive force in the motor armature 1 and result in an increase in the current flowing through the armature, thereby tending to maintain substantially constant motor speed. In some instances where the main driving motor may be connected in a traction equipment, such that the voltage may be lost entirely when the equipment passes over a break in the third rail connection, the main motor 1 may tend to act as a generator due to its inertia, which will cause the voltage drop across the commutating field exciting winding 11 or other suitable shunt to be reversed from its normal direction, thereby tending to reverse the energization of the field exciting winding 10 for the exciter. In order to prevent such reversal of current through the exciter field exciting winding 10, a rectifier 14 is connected in series with the field exciting winding 10 to prevent reverse current flow through this winding. The difference in the time constant for the two field exciting windings 7 and 8 of the main motor may also be increased by arranging these field exciting windings with as small mutual inductance as possible, which may be done by locating these windings wholly or partly on different poles of the motor. Furthermore, it is also preferable that the mutual inductance between these two auxiliary field exciting windings 7 and 8 and the main shunt field exciting winding 5 be made as small as possible to minimize interference between the desired energization and response of these windings.

Figure 2:
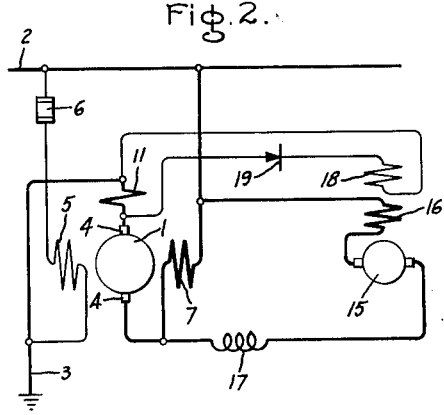

In Fig. 2 I have shown another embodiment of my invention in which the main motor is provided with an armature 1 and a main field exciting winding 5 which is connected in shunt with the armature 1 across a suitable source of electrical power supply 2—3, similar to the arrangement shown in Fig. 1. In this arrangement, the main field exciting winding 5 also preferably is connected in series with a non-linear current-voltage characteristic resistance 6 of the same type as that described with respect to Fig. 1 to compensate for the non-linearity of the magnetization curve of the machine. As in the arrangement shown in Fig. 1, a series field exciting winding 7 is connected in series with armature brushes 4 across the source of electrical power supply 2—3 to provide a component of excitation to the motor responsive to the armature current and acting in the same direction as the main component of excitation provided by the shunt field exciting winding 5. The motor also is provided with a commutating field exciting winding 11 in series with the armature 1 to improve the commutation of the machine. As previously described, it is desirable that the excitation of the field exciting winding 7 should be substantially nullified during steady state conditions and should be effective mainly during transient changes in the motor armature current. In this system this is obtained by arranging an exciter in shunt with the series field exciting winding 7 which is adapted to carry the main portion of the motor armature current during steady state conditions. This exciter is adapted to provide a diverting circuit having a relatively appreciable time lag to changes in motor armature current, and is constructed in such a manner that its connection in shunt with the motor series field exciting winding 7 minimizes excitation provided by this series field exciting winding 7 under steady state motor armature conditions by diverting a maximum of the motor armature current therethrough the maximizes excitation provided by the motor series field exciting winding 7 under transient motor armature current conditions by being connected in a circuit which damps tendencies to change the energization provided by the exciter due to the inductance of the circuit and its relatively appreciable time lag. The exciter is provided with an armature 15 and a series field exciting winding 16 connected across the motor series field exciting winding 7 through a choke coil 17 which preferably is added to this circuit in order to increase further the inductance of the circuit and thereby further increase the time lag thereof. The main control field exciting winding for the exciter is a separately excited field exciting winding 18 which is connected across a shunt in the main motor circuit which in this instance is the commutating field exciting winding 11 which is an inductive shunt and therefore provides energization to the exciter control field exciting winding 18 which is relatively slow in response to changes in the armature current of the motor. As in the arrangement shown in Fig. 1, it is also desirable to prevent the reversal of the polarity of the exciter and therefore a one-way rectifier 19, preferably of the dry type, is connected in series with the field exciting winding 18 to prevent reversal of energization of this winding. This exciter main control field exciting winding 18 acts in a direction such that the exciter produces an armature voltage having the same polarity or direction relative to the voltage across the motor series field exciting winding 7 due to the source of supply 2—3, such that the current through the exciter armature 15, due to its own voltage, tends to flow in the same direction as current would tend to flow through the exciter diverter circuit due to the external voltage from the source of supply 2—3. In other words, the exciter armature 15 is adapted to provide a voltage across the motor series field exciting winding 7 which would tend to reverse the direction of flow of current through the field exciting winding 7 from the direction of current flow therethrough resulting from its connection to the external source of supply 2—3, thereby opposing the flow of current through the field exciting winding 7 due to the voltage thereacross from the external source. This is the equivalent of the placing of a very low resistance shunt across the series field exciting winding 7 so that there is a relatively low drop in voltage across the field exciting winding and most of the current will then flow through the low resistance shunt and not through the series field exciting winding 7. Thus, under steady state motor armature current conditions, most of the current flows through the diverting circuit, including the exciter, and the motor series field exciting winding 7 provides substantially no excitation to the main driving motor armature 1. During transient or surge conditions, the relatively slow rate of response of the exciter due to the inductance of this circuit and the arrangement of the field exciting windings for the exciter causes the effective resistance of the diverting circuit to be relatively high compared to that of the motor series field exciting winding 7 so that the field exciting winding 7 provides a relatively large series component of excitation to the main driving motor, thereby effectively inducing a relatively high counterelectromotive force in the motor armature 1 which tends to damp out changes in the motor armature current during such transient conditions in a manner similar to that of the circuit shown in Fig. 1.

Figure 3:
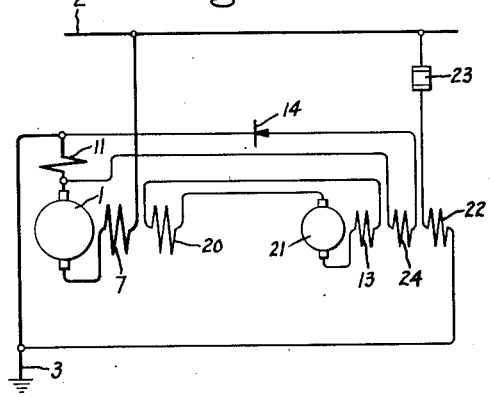

I have shown another electrical system in Fig. 3 in which the main driving motor is provided with only three field exciting windings by combining certain components of excitation in the exciter of the system and supplying the resultant excitation to a single field exciting winding on the main driving motor which acts both as a separate excitation and a series component of excitation which is opposed by a component of excitation provided to the main driving motor by a series field exciting winding. In this system the main driving motor is provided with an armature 1 which is connected to a suitable source of power supply 2—3 through a commutating field exciting winding 11 and a series field exciting winding 7. The main excitation for the motor is provided by a separately excited field exciting winding 20 which is adapted to be energized by an exciter having an armature 21 provided with a main field exciting winding 22 connected across the source of power supply 2—3 through a non-linear voltage-current resistor 23 similar to the resistances 6 in Figs. 1 and 2. In this arrangement, a separately excited field exciting winding 24 is provided on the exciter which is adapted to be energized in response to the main driving motor armature current by being connected across the main motor commutating field exciting winding 11 which functions as a shunt in the circuit of the main motor armature 1. This separately excited field exciting winding 24 of the exciter is arranged on the machine to provide a component of excitation thereto in opposition to the main exciter control field exciting winding 22, such that the net excitation of these two field exciting windings on the exciter is the difference between the components of excitation produced thereby, and the energization to the main motor field exciting winding 20 therefore is proportional to this net or resultant excitation provided by the two field exciting windings 22 and 24 on the exciter. Under normal steady state motor armature current conditions, the series field exciting winding 7 of the main motor produces a cumulative component of excitation to the motor which is adapted to assist the excitation provided by the main field exciting winding 20 and to be of such magnitude that the component of excitation of the series field exciting winding 7 is substantially equal to the differential effect of the field exciting winding 24 on the energization of the main motor field exciting winding 20 with the result that the net excitation of the main driving motor under steady state motor armature conditions is substantially that of only the separate excitation without any series field component. Under transient conditions however the time lag of response of the exciter to changes in the main motor armature current due to the time lag of the component of excitation provided to the exciter by the field exciting winding 24 will be such that a series component of excitation provided to the main drive motor by its series field exciting winding 7 without appreciable time lag will predominate and provide a series component of excitation to this main motor which is additive to the component of excitation provided thereto by its main separately excited field exciting winding 20, thereby providing a compounding effect to this main drive motor, which produces a counterelectromotive force in the main motor armature 1 opposing changes in the motor armature current during such transient conditions. Thus, as in the electrical systems shown in Figs. 1 and 2, the series component of excitation of this system also is substantially ineffective during steady state armature current conditions, and is effective only as a transient cumulative to the main shunt excitation of the motor during transient armature current conditions, thereby providing a damping effect which tends to maintain the driving motor armature current substantially constant or in such a relation to its excitation as to maintain a substantially constant operating speed. In this system, reverse polarity of the exciter also is prevented by the provision of a rectifier 14 connected in series with the exciter field exciting winding 24, and the time lag of the exciter is further increased by a series field exciting winding 24 connected in its armature circuit.

Figure 4:
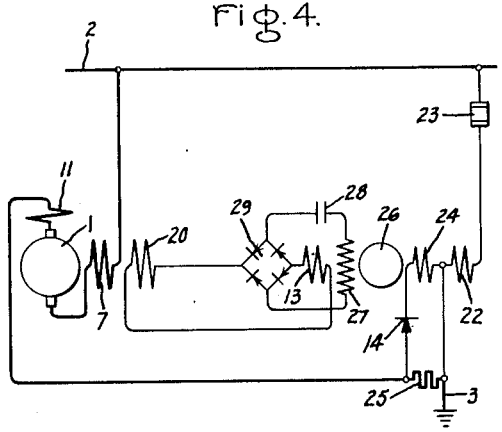

If desired, the exciter may be built as an alternating current machine of the inductor alternator type in which neither slip rings nor commutators are used, and the output of the alternator may be rectified for application to the exciting winding of the main driving motor. In Fig. 4 I have shown such an electrical system which is similar to the arrangement shown in Fig. 3 in which the main driving motor is provided with an armature 1, a commutating field exciting winding 11, and a series field exciting winding 7. In this instance the main driving motor also is provided with a separately excited main field exciting winding 20 which is adapted to be energized by a high frequency alternator which functions in a manner similar to the direct current exciter shown in Fig. 3 and is provided with a separately excited field exciting winding 22 connected in shunt with the main driving motor across the source of power supply 2—3 through a non-linear voltage-current characteristic resistance 23 similar to that in Fig. 3 to provide a response to the main exciter field exciting winding 22 which inherently compensates for the non-linearity of the exciter magnetization curve. In this arrangement the series component of excitation is provided to the exciter by a field exciting winding 24 connected across a non-inductive shunt 25 connected in series with the main driving motor armature 1, such that the energization of the exciter field exciting winding 24 is responsive to the main motor armature current. As in the arrangement shown in the other figures, this field exciting winding 24 of the exciter is energized through a one-way rectifier 14 to prevent reversal of excitation to the exciter by the series field exciting winding 24. The high frequency alternator is provided with a rotor 26 of magnetic material which may be driven in any suitable manner at a substantially constant speed for inducing a relatively high frequency alternating current in a stationary armature winding 27 which is preferably connected through a capacitor 28 across a full-wave rectifier 29 of any suitable type, such as a dry type rectifier, to the other terminals of which the main motor field exciting winding 20 is connected. In this system, as in the systems shown in Figs. 1 and 3, the exciter is preferably also provided with a field exciting winding 13 connected in series with the main motor field exciting winding 20 to provide a component of self-excitation to the exciter, thereby increasing the time constant of this machine and further increasing the lag in response to current changes of this machine in the main driving motor. The operation of this system is essentially the same as that in Fig. 3, in which the series component of excitation provided by the field exciting winding 24 to the exciter provides a component of energization to the main motor field exciting winding 20 which provides excitation substantially equal and opposite to that of the series field exciting winding 7 under normal steady state operating conditions with the result that this motor operates under substantially only shunt excitation during steady state conditions. Under transient motor armature current conditions, the time lag of the exciter is such that the effects of the field exciting winding 24 on the energization of the main winding 20 is relatively slow compared to the series component of excitation provided by the main motor field exciting winding 7 and therefore the series component of excitation provided by the winding 7 predominates and provides a compounding cumulative effect to the shunt excitation component provided by the field exciting winding 20 which induces a back electromotive force in the armature which tends to oppose changes in the main motor armature current, and thereby tends to maintain a substantially constant speed characteristic for this motor.

While I have illustrated and described particular embodiments of my invention, modifications thereof will occur to those skilled in the art. I desire it to be understood therefore that my invention is not to be limited to the particular systems disclosed, and I intend in the appended claims to cover all modifications which do not depart from the spirit and scope of my invention.

What I claim as new and desire to secure by Letters Patent of the United States, is:

1. An electrical system including a motor having an armature, means including a field exciting winding for providing a main component of excitation to said motor responsive to the supply voltage of said motor, means including a second field exciting winding connected in series with said motor armature for providing an auxiliary component of excitation to said motor cumulative to said main excitation and without appreciable time lag to changes in motor armature current, means including an auxiliary field energizing source responsive to motor armature current connected to energize said motor second field exciting winding for providing a second auxiliary component of excitation to said motor opposed to said main excitation and substantially equal to said first-mentioned auxiliary component of excitation under steady state motor armature current conditions, and a reactance element in circuit with said auxiliary field energizing source for delaying the response of said energizing source to transient changes in armature current.

2. An electrical system including a direct current motor having an armature, means including a field exciting winding for providing a main component of excitation to said motor responsive to the supply voltage of said motor, means including a second field exciting winding connected in series with said motor armature for providing an auxiliary component of excitation to said motor cumulative to said main excitation and without relatively appreciable time lag to changes in motor armature current, means for varying the energization of said motor series field winding including a diverting circuit connected in shunt with said motor series field exciting winding, a dynamo-electric exciter in said diverting circuit, and a reactor in said diverting circuit for introducing time delay therein.

3. An electrical system including a motor having an armature, means including a field exciting winding for providing a main component of excitation to said motor responsive to the supply voltage of said motor, means including a second field exciting winding connected in series with said motor armature for providing an auxiliary component of excitation to said motor cumulative to said main excitation and responsive without appreciable time lag to changes in motor armature current, a third field exciting winding for said motor, and means including an auxiliary field energizing source responsive to motor armature current connected to energize said motor third field exciting winding for providing a second auxiliary component of excitation to said motor opposed to said main excitation and substantially equal to said first-mentioned auxiliary component of excitation under steady state motor armature current conditions, and a reactance element in series with said third field exciting winding for introducing time delay in said third field winding circuit.

4. An electrical system including a motor having an armature, means including a field exciting winding for providing a main component of excitation to said motor responsive to the supply voltage of said motor, means including a second field exciting winding connected in series with said motor armature for providing an auxiliary component of excitation to said motor cumulative to said main excitation and responsive without appreciable time lag to changes in motor armature current, a third field exciting winding for said motor opposed in polarity to said series field exciting winding, an auxiliary field excitation source including a dynamo-electric exciter having a field exciting winding energized responsive to motor armature current, and means including a choke coil for connecting said exciter to said motor third field exciting winding for providing a second auxiliary component of excitation to said motor opposed to said main excitation and substantially equal and opposite to said first-mentioned auxiliary component of excitation under steady state motor armature current conditions.

5. An electrical system including a motor having an armature, means including a field exciting winding for providing a main component of excitation to said motor responsive to the supply voltage of said motor and having a non-linear current-voltage characteristic resistance in circuit therewith producing proportionately greater changes in the energization thereof than in the supply voltage, a second field exciting winding connected in series with said motor armature for providing an auxiliary component of excitation to said motor cumulative to said main excitation and responsive without appreciable time lag to changes in motor armature current, motor armature current responsive means for providing a second auxiliary component of excitation to said motor opposed to said main excitation and substantially equal and opposite to the said first-mentioned auxiliary component of excitation under steady state motor armature current conditions, and time delay means including a reactance device for rendering said last named means ineffective during rapid variations in armature current.

ARTHUR MANDL.

REFERENCES CITED

The following references are of record in the file of this patent:

UNITED STATES PATENTS

| Number | Name | Date |
|---|---|---|
| Re. 14,787 | Stephenson | Jan. 6, 1920 |
| 515,473 | Higham | Feb. 27, 1894 |
| 524,373 | Bentley | Aug. 14, 1894 |
| 1,876,548 | Atherton | Sept. 13, 1932 |
| 1,946,303 | Brown | Feb. 6, 1934 |
| 1,957,208 | Harris | May 1, 1934 |
| 2,254,043 | Lynn | Aug. 26, 1941 |
| 2,297,350 | Fisher | Sept. 29, 1942 |

FOREIGN PATENTS

| Number | Country | Date |
|---|---|---|
| 180,754 | Great Britain | June 1, 1922 |
| 370,881 | Great Britain | Oct. 9, 1930 |
| 389,801 | Great Britain | June 18, 1931 |